(12) United States Patent
Boscovic et al.

(10) Patent No.: US 7,743,121 B2
(45) Date of Patent: Jun. 22, 2010

(54) METHOD AND APPARATUS FOR SETTING UP AND MANAGING OPERATIONAL ENVIRONMENT IN P2P WIRELESS NETWORKS

(75) Inventors: Dragan M. Boscovic, South Barrington, IL (US); Wlodzimierz S. Czarnocki, Hoffman Estates, IL (US); Lawrence M. Ecklund, Wheaton, IL (US); Gary W. Grube, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 289 days.

(21) Appl. No.: 11/839,133

(22) Filed: Aug. 15, 2007

(65) Prior Publication Data

US 2009/0049159 A1 Feb. 19, 2009

(51) Int. Cl.
*G06F 15/177* (2006.01)
(52) U.S. Cl. ...................... 709/221; 713/100
(58) Field of Classification Search ......... 709/220–223; 713/100
See application file for complete search history.

(56) References Cited

U.S. PATENT DOCUMENTS

| | | | |
|---|---|---|---|
| 5,745,879 A | 4/1998 | Wyman | |
| 5,946,634 A | 8/1999 | Korpela | |
| 6,029,144 A | 2/2000 | Barrett et al. | |
| 6,055,229 A | 4/2000 | Dorenbosch et al. | |
| 6,430,698 B1 | 8/2002 | Khalil et al. | |
| 6,768,901 B1 | 7/2004 | Osborn et al. | |
| 6,795,688 B1 | 9/2004 | Plasson et al. | |
| 6,963,573 B1 | 11/2005 | Cain et al. | |
| 6,973,335 B2 | 12/2005 | Ganton | |
| 7,016,695 B1 | 3/2006 | Bahai | |
| 7,076,246 B2 | 7/2006 | Chitrapu | |
| 2002/0184374 A1 | 12/2002 | Morikawa | |
| 2003/0040328 A1 | 2/2003 | Indirabhai | |
| 2004/0028003 A1 | 2/2004 | Diener | |
| 2004/0047324 A1 | 3/2004 | Diener | |
| 2005/0048963 A1 | 3/2005 | Kubler et al. | |
| 2005/0058153 A1 | 3/2005 | Santhoff et al. | |

(Continued)

FOREIGN PATENT DOCUMENTS

WO 2007-082244 A2 7/2007

OTHER PUBLICATIONS

Eric Nicollet et al., "Specification and Preliminary Design of Mechanisms and Processes Enabling End-to-End Dynamic Reconfiguration," End-to-End Reconfigurability II—E2R II, Sixth Framework Programme, Aug. 9, 2006, 134 pages in 2 parts.

(Continued)

*Primary Examiner*—Salad Abdullahi
(74) *Attorney, Agent, or Firm*—Barbara R. Doutre

(57) ABSTRACT

In a cognitive radio, a method of establishing an operational policy for use in a Peer-to-Peer (P2P) group, wherein the policy can be described by layers of policy parameters with progressively higher layers having a progressively increasing number of parameters, involves determining that a policy change is to be made from a current policy; requesting policy information from at least one P2P group member; receiving a policy description from the at least one P2P group member; and implementing a change in the lowest layer policy parameter to establish a new operational policy.

11 Claims, 10 Drawing Sheets

U.S. PATENT DOCUMENTS

| | | |
|---|---|---|
| 2005/0125494 A1 | 6/2005 | Horii et al. |
| 2005/0130653 A1 | 6/2005 | Bisdikian et al. |
| 2005/0169221 A1 | 8/2005 | Bennett |
| 2006/0009209 A1 | 1/2006 | Rieser et al. |
| 2006/0023686 A1 | 2/2006 | Jeong et al. |
| 2006/0083205 A1 | 4/2006 | Buddhiko et al. |
| 2006/0088010 A1 | 4/2006 | Buchwald et al. |
| 2006/0211404 A1 | 9/2006 | Cromp et al. |
| 2006/0256884 A1 | 11/2006 | Tomioka et al. |
| 2007/0027972 A1 | 2/2007 | Agrawal et al. |
| 2007/0268516 A1 | 11/2007 | Bugwadia et al. |
| 2008/0151856 A1* | 6/2008 | Glick et al. ................ 370/343 |
| 2008/0154826 A1 | 6/2008 | Backof et al. |
| 2008/0155249 A1 | 6/2008 | Backoff et al. |

OTHER PUBLICATIONS

Jijun Lou et al., "Analysis of Combined Strategies Including Concepts, Algorithms and Reconfigurable Architecture Aspects," End-to-End Reconfigurability II—E2R II, Sixth Framework Programme, Jan. 12, 2006, 160 pages in 3 parts.

Mitola, et al. "Cognitive Radio: Making Software Radios More Personal," IEEE Personal Communications, Aug. 1999, pp. 13-18.

Leino, Anne-Tuulia "The future usage of radio spectrum for mobile communications", European Spectrum Management Conference 2006, Mar. 29-30, 2006, Brussels, www.umts-forum.org.

Menzel, Christian "Spectrum management between harmonisation and liberalisation", European Spectrum Management Conference 2006, Mar. 29-30, 2006, Brussels, www.umts-forum.org.

Brodersen, et al. "CORVUS: a cognitive radio approach for usage of virtual unlicensed spectrum", White paper, Jul. 29, 2004.

Mangold, et al. "Cognitive radio—trends and research challenges", Comtec, Mar. 2005.

Marshall, Preston, "XG communications program information briefing", International Telecommunications Union study group 8, Sep. 2004.

Fournier, Eric, "Spectrum trading and liberalization: any difficulty?", European Spectrum Management Conference 2006, Mar. 29-30, 2006, Brussels, www.umts-forum.org.

Pujol, Frederic, Panel Discussion, "Assessing the future demand of spectrum and the dangers and opportunities to businesses that will be created", European Spectrum Management Conference 2006, Mar. 29-30, 2006, Brussels, www.umts-forum.org.

Pogorel, Gerard, "Radio technologies and spectrum policies 2006: a turning point?", 28th IDATE Int'l Conf., Nov. 14-16, 2006, LeCorum—Montpellier FR.

Pogorel, Gerard, "Radio spectrum policy and management: a turning point?", Communications & Strategies, No. 49, 1st quarter 2003, p. 109.

Rudra, Angsuman, "Cognitive radio: an evolution from software radio", VMEbus Systems, Dec. 2004.

Yuguchi, Kiyotaka, Panel Discussion: Transition and Implementation—Learning from the experiences of others, Spectrum policy: experience in Japan, European Spectrum Management Conference 2006, Mar. 29-30, 2006, Brussels, www.umts-forum.org.

Martigne, Patricia, "Cognitive radio: sharing spectrum the smarter way", European Spectrum Management Conference 2006, Mar. 29-30, 2006, Brussels, www.umts-forum.org.

Hahn, Rudiger, "A look at the future of spectrum regulation", European Spectrum Management Conference 2006, Mar. 29-30, 2006, Brussels, www.umts-forum.org.

Hewitt, Tim, "Ensuring the correct timing of transition to liberalised markets", European Spectrum Management Conference 2006, Mar. 29-30, 2006, Brussels, www.umts-forum.org.

Long, Colin, "The protection of spectrum rights", European Spectrum Management Conference 2006, Mar. 29-30, 2006, Brussels, www.umts-forum.org.

Glick et al., U.S. Appl. No. 11/614,383, filed Dec. 21, 2006, Motorola, Inc.

Backof et al., U.S. Appl. No. 11/614,403, filed Dec. 21, 2006, Motorola, Inc.

Cooper, "Governing The Spectrum Commons: A Framework for Rules Based on Principles of Common-Pool Resource Management," Mar. 2006, 34 pages from http://cyberlaw.stanford.edu/attachments/GOVERNING%20THE%20SPECTRUM%20COMMONS.pdf.

Lewis, et al., "Managing Policies for Dynamic Spectrum Access," D. Gaiti, et al. (Eds): AN 2006, LNCS 4195, pp. 285-297, 2006. IFIP International Federation for Information Processing 2006. 13 pages.

Guo, et al., "Investigation on Spectrum Sharing Technology Based on Cognitive Radio," 1st international Conference on Communications and Networking in China, 2006, ChinaCom '06, Oct. 25-27, 2006, pp. 1-5.

Haykin, "Cognitive Radio: Brain-Empowered Wireless Communication," IEEE Journal on Selected Areas in Communications, vol. 23, No. 2, Feb. 2005, pp. 201-220.

Newman, et al., "Congnitive Engine Implementation for Wireless Multicarrier Transceivers," Wireless Communications & Mobile Computing, vol. 7, Issue 9, Nov. 2007, pp. 1129-1142.

Muck et al., "Evolution of Wireless Communication Systems Towards Autonomously Managed, Cognitive Radio Functionalities," IEEE 64th Vehicular Technology Conference, 2006, VTC-2006, Fall 2006, Sep. 25-28, 2006, pp. 1-5.

Sang Woo Kim, "PCT Internationa Search Report and Written Opinion," WIPO, ISA/KR, Korean Intellectual Property Office, Daejeon, Republic of Korea, Jan. 23, 2009.

\* cited by examiner

METHOD AND APPARATUS FOR SETTING UP AND MANAGING OPERATIONAL ENVIRONMENT IN P2P WIRELESS NETWORKS

FIELD OF THE INVENTION

The present invention relates generally to, in certain embodiments, the field of software defined radios and cognitive radios. More particularly, certain embodiments consistent with this invention relate to methods and apparatus for setup and management of an operational environment for such radios in a peer to peer environment.

BACKGROUND

Radio communication technology has traditionally been based upon fixed frequency or spectrum assignments and fixed modulation techniques (as well as other regulatory agency established parameters). For example, a particular local government agency such as a police department might be assigned several frequencies for its use using frequency modulation for voice communication. Frequency spectrum could often be shared in order to more efficiently use the spectrum by, for example, sub-audible digital or analog coding embedded in the transmitted signals. Nevertheless, in such an environment, the assigned frequencies are off limits for use by others and usage would rarely approach full utilization. In fact, utilization might amount to only a few percent of the available communication throughput. As a result, frequency spectrum is inefficiently utilized, while simultaneously demand for bandwidth is ever increasing.

A new paradigm for dealing with such a problem is emerging in which a radio is provided with the intelligence to identify underutilized or unutilized spectrum and change its operational parameters to take advantage of the available spectrum while minimizing potential for causing interference. Such radios are commonly configurable and reconfigurable using software control and posses the intelligence to obtain the needed situational awareness to reconfigure in order to enhance spectrum utilization efficiency. Such radios have been dubbed cognitive radios—a form of software defined radio. Cognitive radios are envisioned to be able to cross geographic boundaries and adapt to regulatory changes associated therewith.

One issue that is to be addressed in producing a viable working cognitive radio is the issue of adaptation to new policies as a radio's situation or environment changes. This can happen, for example, by virtue of changes in a geographically static environment as well as changes resulting from geographical movement of the radio (e.g., in an automobile or an airplane). The cognitive radio should be able to competently adapt to such situations

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
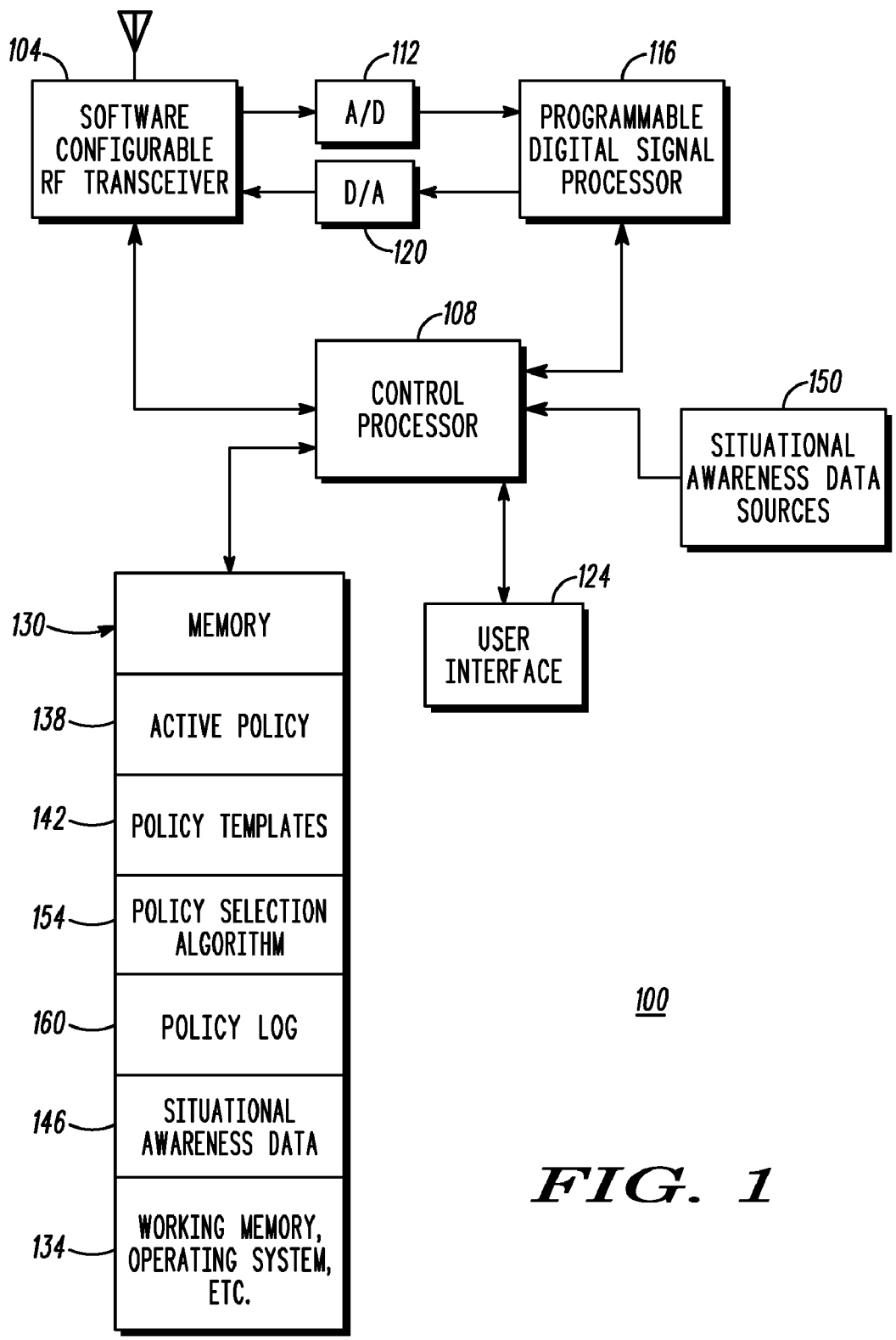
FIG. 1 is an example block diagram of a cognitive radio in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail example embodiments that are in accordance with the present invention, it should be observed that the embodiments reside primarily in combinations of method steps and apparatus components related to the cognitive radio and related processes. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the cognitive radio described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "policy" or "operational policy" is used to generically describe a rule or set of rules that define a parameter or a collection of parameters that specify a communication protocol and related specifications for use in radio communication. Those rules determine the type of waveforms used in modulation of information used for communication. Such policies and parameters thereof may be established or limited by convention, by agreement or by law. Examples of policies and components of policies include, but are not limited to, frequency or frequencies or frequency band, power limits, application, location, situation, wave shape, spectral characteristics, temporal characteristics, packet or other data formats, modulation technique, operational mode, coding, bandwidth, data throughput, encryption parameters and other communication parameters that might be used to specify the operation of a radio communication device.

A policy may be fully defined in some embodiments by a policy identifier or policy code, while in other embodiments; a policy may be identified by the specific parameters and specifications. In still other embodiments, the policy may be identified by a difference between two policies, or by policy identification with exceptions, or by compressed data explaining, defining or labeling the policy. Any number of other techniques may be devised to identify a policy without deviation from the principles governing embodiments consistent with the present invention. In accordance with certain embodiments consistent with the present invention, policy parameters are abstracted or organized into layers, with lower layers having fewer parameters than higher layers.

For purposes of this document, the term "domain" or "policy domain" is intended to mean a geographical or spatial position or other operational constraint in which a particular policy is in force—generally, but not necessarily, by virtue of regulations established by a regulating authority (e.g., in the U.S., the Federal Communication Commission is one such regulatory authority). It is noted that a policy domain may include radio spectrum that is unregulated or is nearly unregulated, and which can be utilized in accordance with certain embodiments as well as licensed spectra. It should also be noted that a policy domain should not be construed to be limited to movement from one regulatory authority's jurisdiction to that of another, since local spectrum usage, topology, etc. may also give rise to a change in domain.

For purposes of this document, the term "software defined radio" (SDR) is intended to mean a radio communication device whose operational parameters are established by software. Thus, an SDR may be configured and reconfigured under software control to comply with a particular set of operational parameters (i.e., a policy). An example SDR may operate in multiple bands and in multiple modes.

For purposes of this document, the term "cognitive radio" (CR) is used to mean a configurable radio such as a software defined radio that has the ability to configure itself for operation based upon its operational environment. That is, a CR is able to determine or seek out an operational policy applicable to its capability, location, applicable policies, laws, regulations, spectral congestion, likelihood of receiving or causing interference, and/or similar considerations. A cognitive radio can take many forms and have varying degrees of "situational awareness" that permits the cognitive radio to select (or have selected for it) an appropriate operational policy. The CR can then configure itself (or be configured) and operate to carry out radio communications according to the operational policy. The term "smart radio" is also sometimes used to describe this type of radio.

"Situational awareness" implies that the cognitive radio is aware of its operational environment to some degree. That situational awareness may be obtained by virtue of the CRs capability to sense parameters such as spectral utilization, or sense or be made aware of position and movement of the CR (e.g., in a car or plane by GPS signals or other means), or by virtue of querying of or receipt of updates from other nearby cognitive radios or other authorities to obtain such situational awareness. This situational awareness is used by the CR in order to establish or receive an appropriate operational policy for use in a given situation in order to achieve efficient or reliable communication.

The term "authority" is used broadly herein to encompass other cognitive radios, as well as base stations, servers and other sources of information from which policy information can be obtained.

An assumption to be used in considering the functioning of a cognitive radio is that a common signaling and communication mechanism should be available to all CRs (or at least all CRs in a particular collection of CRs). This assumption permits the cognitive radios to communicate at a basic level to permit configuration of a group of cognitive radios for communication among themselves and to exchange information contributing to situational awareness to aid in optimizing communication. This mode, as well as other modes, of communication and data/information exchange in which CRs talk directly to each other is called Peer-to-Peer (P2P). Two possibilities are proposed for achieving this functionality. In the first, an agreed upon standard protocol is established in which all CRs possess the native ability to communicate. In the second, cognitive beacons are provided which act as translators between normally incompatible protocols to permit communication among cognitive radios. In either case, however, the present document presumes establishment and existence of such a common mechanism for communication between CRs. At this writing an accepted protocol has not been established, but it is clear that establishment of such a protocol is a formality and a matter of national and/or international regulatory agreement, convention, treaty, etc., with no substantial technical barriers to be overcome. The presence of agreements at this time on such a specified mechanism is not necessary to the understanding of the present embodiments.

FIG. 1 depicts a simplified embodiment of a software defined radio capable of operation as a cognitive radio 100. Such CR 100 incorporates a radio frequency (RF) transceiver 104 that is configurable under software control by instructions received from a control processor (e.g., a microprocessor or microcontroller) 108 in order to establish an air interface used by the transceiver 104 to carry out suitable communications. Received analog radio waves are downconverted by the receiver section of the RF transceiver 104 and converted to digital by A/D converter 112 for processing by a programmable digital signal processor (DSP) 116. Similarly, digital data (which may include digitized voice) is passed from the DSP 116 to D/A 120 for transmission by the RF transceiver 104's transmitter. Analog to digital and digital to analog conversion may be bypassed in certain embodiments of digital communication scenarios.

The programmable DSP 116 operates under control of control processor 108 which configures the DSP for the particular policy in use at the time. A user interface 124 provides audio or visual data to and from a user of the cognitive radio 100. Control processor 108 has an associated memory (or other suitable storage) 130 that stores instructions that are used to process the policy actions of the cognitive radio 100. Memory 130 includes working memory 134 carrying programs and operating system and satisfies other such storage requirements. A portion of memory 130 may also be reserved for storage of parameters of a currently active policy at 138. Another portion of memory 130 may be used to store policy templates at 142, while still another part of memory 130 may store situational awareness data at 146 used by the cognitive radio 100. Situational awareness data can be received from many sources including GPS data, data received via the receiver of RF receiver 104, user input, sensors, etc. For simplicity, this situational data are represented as coming from block 150, but the presence of a single block representing a source of this data should not be construed to be limiting in any way. Situational awareness data input are represented this way purely for conceptual convenience without regard for the hardware which might be employed to produce such data. A policy log 160 is also maintained according to certain embodiments in order to facilitate reuse of prior policy decisions that worked well in the past under similar or identical situations (e.g., location).

In the P2P communication mode of operation, it is desirable for a CR to have a high degree of situational awareness. Due to the infrastructureless nature of P2P communication, communication is often quite localized. For that reason the awareness data exchanged between the cognitive radios may be narrowly applicable and/or valid for the current situation in which a CR find itself. When the position of the radios in a P2P group setting and/or the number of radios in the P2P group is dynamically changing, a communication policy may need to be updated on a comparatively frequent basis. Data gathered from localized sensors or other peers in a P2P group may be more relevant or more significant than similar types of data obtained from centralized sources of situational awareness data. For the above reasons, it is desirable to have an attribute associated with each piece of awareness information that describes the nature of its source (centralized or local), or from which the nature of the source can be deduced. Such data can be useful in the reasoning/decision making of a given CR. For example, the CR may ascertain a degree of reliability of policy information in a particular setting based upon the nature of the source of the information.

Memory 130 further incorporates, in certain embodiments, varying forms of policy selection algorithms 154 which depend upon numerous factors including, but not limited to, situational awareness data, reliability of situational awareness data, nature of source of policy information, currently active policy, policy templates, logged policy data, etc.

Implementing policy changes in a cognitive radio is a complex issue involving many factors. In order to understand the complexity of the problem, it is instructive to consider several general operational considerations for a cognitive radio. First, one should recognize that as this technology evolves and as new CRs are developed and computing power available to the CR increases, a variety of CRs may be in communication, with each having varying knowledge, situational awareness, historical data and computing power. As a result, a cognitive radio should be able to adapt policy use decisions based upon a multitude of factors, not the least of which might be the ability to take advantage of a more powerful, more reliable or more knowledgeable CR from which it can obtain valuable information to be used in establishing a suitable policy for a given situation.

Figure 2:
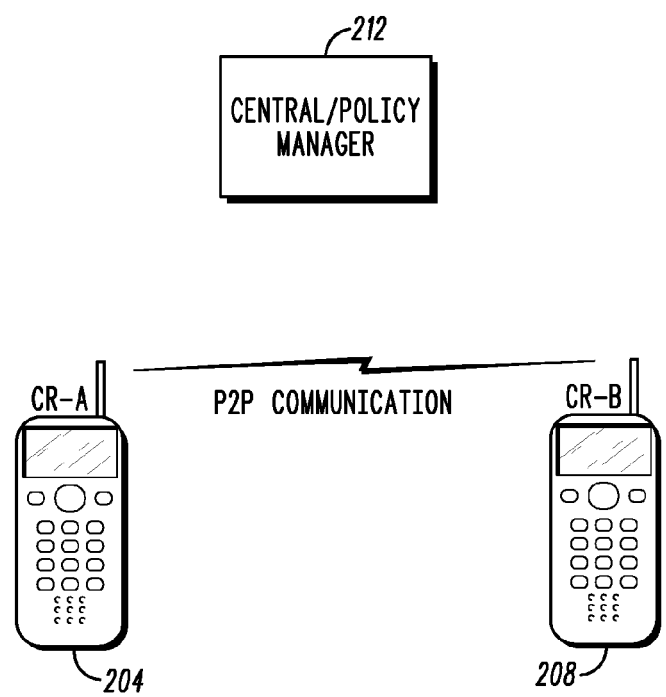
FIG. 2 is an example diagram illustrating a cognitive radio network in accordance with some embodiments of the invention.
Figure 3:
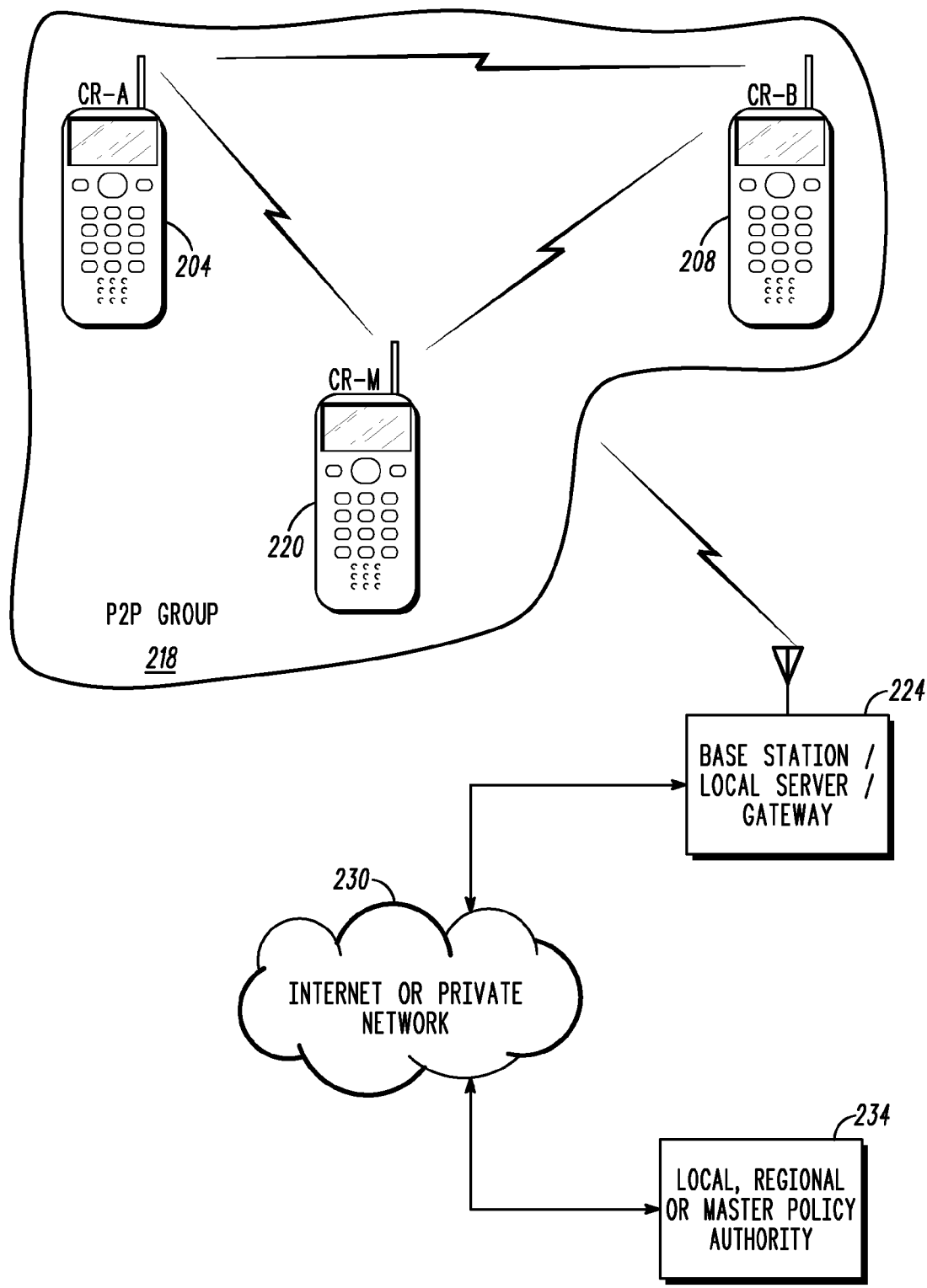
FIG. 3 is an example of another cognitive radio network in accordance with some embodiments of the invention.

Cognitive radios can be configured to operate in any number of ways. Consider FIG. 2 for example. In this example, a first cognitive radio CR-A (204) may directly communicate with a peer cognitive radio CR-B (208) in a so-called "peer to peer" (P2P) communication session. The cognitive radios may establish a suitable policy for use in this peer-to-peer environment via any number of techniques including, but not limited to, the cognitive radios' situational awareness, negotiation with each other, consultation with other cognitive radios in range, or consultation with a central (or local or regional) policy manager 212 or other authority, Another, more elaborate, example environment for cognitive radio communication is depicted in FIG. 3 in which any number of hierarchies may be utilized for obtaining the situational awareness necessary for obtaining an appropriate operational policy. Generally speaking, the depicted hierarchy of authority in policy decision making increases from top to bottom in this illustration. In this example, a peer-to-peer group 218 is depicted as having three member cognitive radios—204, 208 and CR-M 220. In this example, the group 218 may operate as an autonomous communication group, or may utilize the services of a base station or repeater 224 in a more or less conventional manner once an appropriate policy is established for such communication in which one of the CRs assumes gateway functionality and connects rest of the P2P group to the centralized infrastructure. The reader is reminded that all cognitive radios are presumed to be able to communicate using a common signaling protocol in order to establish or change a policy.

In communication group 218, one member may be established as a "master" who can dictate policy to the others in the communication group. It is not necessary for "master" and gateway-functionalities to reside in the same CR. In this case, assume that CR-M (220) is such a master. If for any reason the master wishes to change policy (either autonomously, or under user instruction) CR 220 can dictate that change to the subordinate CRs 204 and 208 using appropriate signaling. Envision, by way of example, that CR 220 is controlled by a sheriff or military commanding officer, who deems that the policy should be changed to permit communication with a broader range of personnel operating together in an emergency situation or to adapt to loss of communication with a member of the group.

When base station 224 is in a position to assist with policy decisions, such decisions may be implemented either by assistance of the computing power available at the base station, or may be dictated by the base station, operating in the role of a more computationally powerful cognitive radio itself. Additionally, base station 224 may operate in the capacity of a gateway that utilizes either a private data network or the Internet 230 to obtain additional assistance, or policy instructions from a local, regional or master policy authority 234. Hence, a cognitive radio may take advantage of numerous resources at its disposal, in addition to any locally or internally generated situational awareness data available to it in order to make policy decisions.

Figure 4:
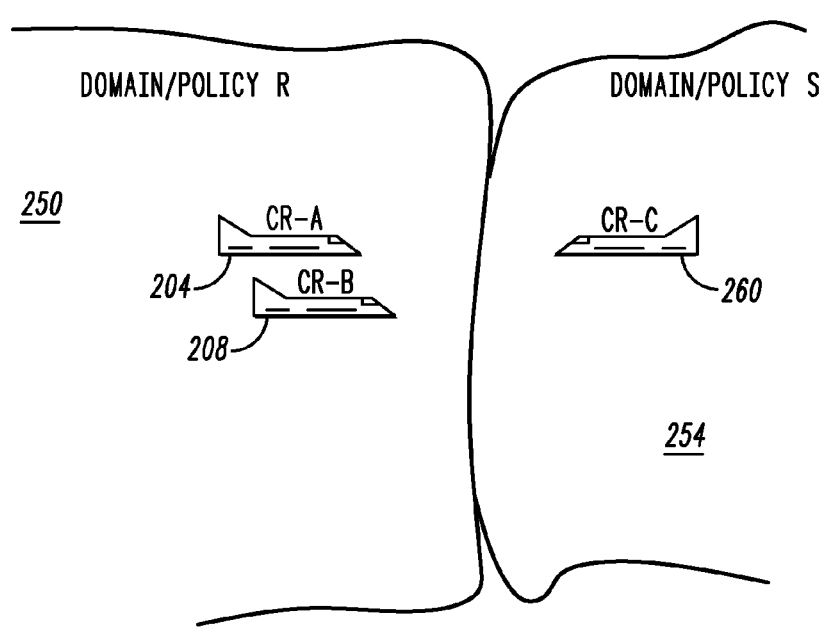
FIG. 4 is an example illustration of a change of domains of a cognitive radio in accordance with some embodiments of the invention.
Figure 5:
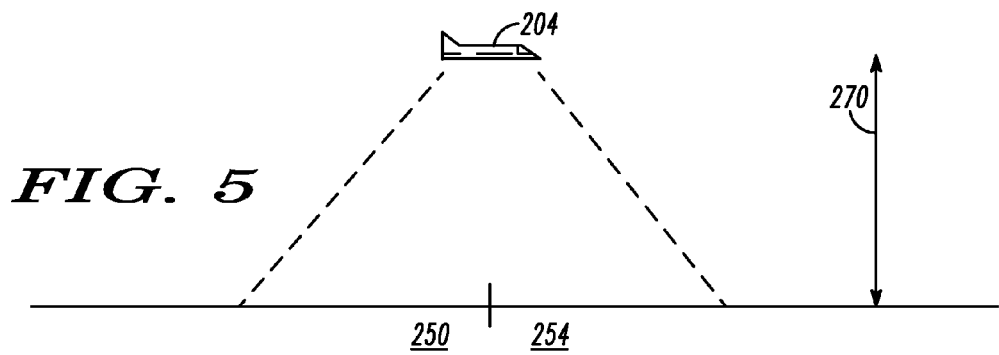
FIG. 5 is another example illustration of a change of domains of a cognitive radio in accordance with some embodiments of the invention.
Figure 6:
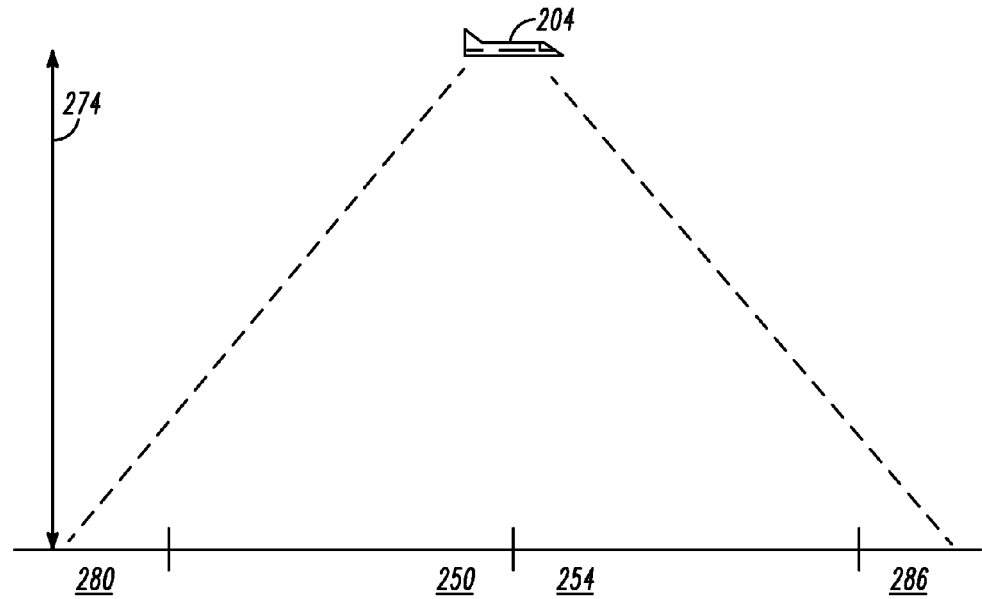
FIG. 6 is another example illustrating a change of domains of a cognitive radio in accordance with some embodiments of the invention.

Now consider the role of movement as depicted in FIG. 4-6 in making policy decisions. In this example, a pair of CRs (again 204 and 208) are in communication with each other. In this example, the cognitive radios are depicted as traveling from left to right within or as a part of an aircraft. This example could equally well have depicted those CRs traveling in an automobile, train, military vehicle, etc. CR 204 and 208 are shown to be currently operating within a domain 250 that uses policy R, but are approaching a domain 254 with policy S. This is most readily visualized as representing travel across the boundary from one nation to another wherein different regulatory authorities establish the rules of radio communications within their boundaries. Also depicted is a third CR 260 (CR-C) traveling from domain 254 toward domain 250 from right to left. Hence, CR 260 is operating under an appropriate policy S for domain 254. In this example, the CRs 204, 208 and 260 may modify their policies in any number of ways. For example, the various cognitive radios may travel this route frequently and may therefore have stored in their memory an appropriate set of policies and suitable information on when and how to change those policies as they approach the new domain. In other embodiments, the three CRs may query each other to determine an appropriate policy for use.

It should be noted that three policies may be required as the CRs make their way across the regulatory boundary into the adjacent domain. While in domain 250, one policy may be used, while in domain 254 another policy might be used and during their transition between domains, a third commonly workable "transitional" policy might be used. Note that while a particular CR is near a border between domains, it may have to accept a compromise policy that may be undesirable or less than optimal for various reasons (e.g., congestion, poor throughput, etc.), but since near the border transmissions have the potential of causing interference the policy decision should take this into account. Once a domain barrier has been crossed and the potential for interference near the transitional region is gone or minimized, the policy may be changed again in order to maximize throughput.

The example of FIG. 4 is somewhat two dimensional, which may be a realistic assumption when, for example, the cognitive radios are transported via ground transportation, or when a border involves only two domains or even when the transmitted power is very low. This situation is further depicted in FIG. 5 in which the altitude 270 is relatively low or the border between domains is relatively isolated from other domain borders. However, consider the depiction of FIG. 6 in which the altitude 274 is much higher and more than two borders are involved. In this example, domains 250 and 254 are joined by domains 280 and 286 as being relevant to the receipt of transmissions from CR 204. One can readily envision areas, for example in Europe, where multiple boundaries converge in which the scenario depicted is realistic and to be contended with. Hence, the three dimensional aspect of the decision making for establishing a communication policy for CR 204 comes into play since consideration should be given to an effective radiation "footprint" that might overlap multiple domains simultaneously. In addition to compliance with regulatory issues associated with each domain, an effective communication mechanism may be needed which has suitable throughput for a particular application. Simultaneously, creation of interference should be avoided. Hence, geographical position in three dimensional space may need to be taken into consideration in order to establish an appropriate communication policy that meets a "least common denominator" constraint on a selected policy.

Figure 7:
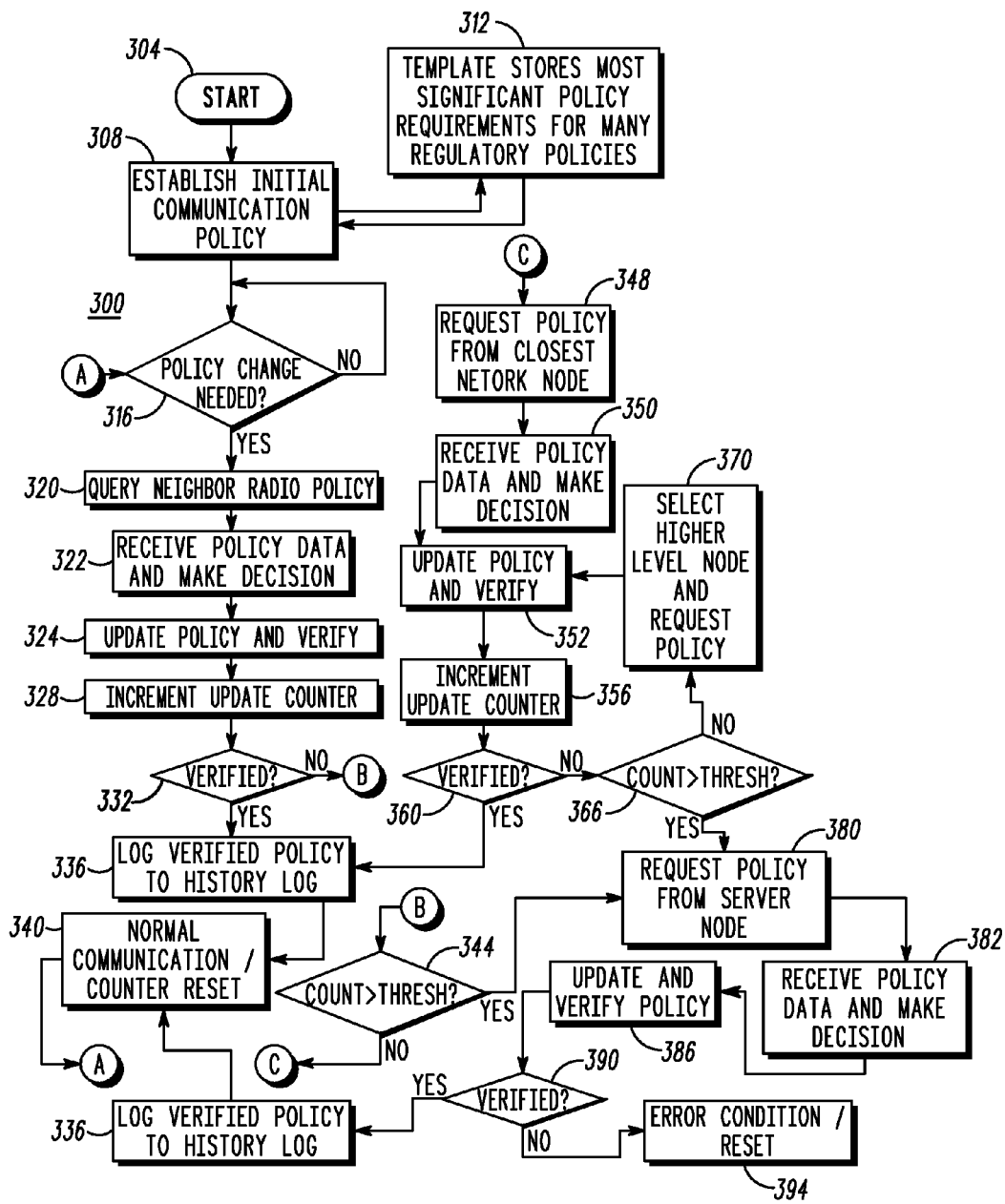
FIG. 7 is a flow chart of an example hierarchical process for changing policies of a cognitive radio in accordance with some embodiments of the invention.

Now consider an exemplary process for acquiring policy related information as depicted as process 300 of FIG. 7 starting at 304. When a cognitive radio is first activated, an initial operational policy is established at 308. Such policy may be based on policy templates stored in memory 130 at 312, as well as historical data and any situational awareness data that might be available. In certain embodiments, the initial startup may also involve transmission of a beacon, a response to which may dictate or suggest a policy or provide enhancements to existing situational awareness. In any event, an initial communication policy is established at 308 which is used until there is a determination at 316 that a policy change should be implemented. Such a determination may be based upon a number of factors including: time, 2 dimensional or 3 dimensional location, velocity and direction of travel, interference, communication quality or failure, data throughput, domain change, type of service/application, level of security, level of battery power, level of available processing power both at local and centralized (infrastructure) processors, available memory and other situational awareness data.

When a policy change is to be implemented at 316, an exemplary hierarchical approach involves looking for and querying neighboring cognitive radios for policy information at 320. When this document discusses a query of a neighbor (or any other entity) for policy information, this should be interpreted to mean a broad range of potential queries. For example, the query can involve one way or two way communication of any or all of the following information: capabilities or class of the querying radio, position of the querying radio, velocity of travel or other information identifying impending domain change, identification of present policy in use, etc.

When this query is received by a neighbor CR, the neighbor may reply in any number of ways. For example, the response may involve communication of any or all of the following information: a code representing a full set of policy information being used by either the responding cognitive radio, a code representing a full set of policy, information that is within the capabilities of the querying radio, a set of suggested or dictated policy parameters, a compressed set of suggested or dictated policy parameters, data representing a policy difference (e.g.—a message stating that the same policy can be used with power reduced from 5 watts to 1 watt), information relating to spectral congestion or interference in the domain being approached, a metric describing the reliability of information being provided, capabilities of the responding radio, situational awareness data, a radio identifier, etc. In accordance with certain embodiments, the response may be in terms of layers of policy information, with queries being directed toward receipt of certain layers as a result of devising the query in accordance with situational awareness information. For example, knowledge that there is little interference and few cognitive radios may mean that a low layer of information is needed. Whereas, larger amounts of interference and large numbers of radios may suggest that higher layers of information are needed to minimize interference.

Once the policy data are received at 322, a decision is made (unless the policy is dictated) as to the policy changes that are to be made. The policy is then updated and verified at 324 to assure suitable functionality of the new policy. A policy update counter can then be incremented at 328 in order to keep track of attempts at establishment of an operative policy. At 332, if the policy is verified as suitable, the policy is logged to the policy log along with data identifying appropriate situations for its use (e.g. time, position, velocity, etc.) at 336. Normal communication functions then ensue at 340 and the update counter is reset. Control then returns to 316 to await the next policy change.

However, in the event the policy is not verified at 332, the count of the update counter is compared with a threshold at 344. If the established threshold for number of attempts to update the policy with a viable policy has not been reached, either the process can return to 320 to find a new peer neighbor radio with better information (not shown for ease of illustration), or the policy request can be escalated to a network node (as depicted in this example) at 348. Hence, at 348, a network node (or similar higher level authority) is queried (e.g., a local base station or master or through a local base station or via point-to-point communication).

Policy information is then received at 350 and a new policy decision can be made. The policy is then updated and verified at 352 and the update counter is incremented at 356. If the new policy is verified at 360, control passes back to 336. Otherwise, control passes to 366 for another inspection of the policy update counter. If the threshold count has still not been reached at 366, then control passes to 370 where a higher level authority can be sought and selected to request new policy data. The process then repeats starting at 352. (In a similar manner, multiple neighbor peer radios can be repeatedly queried until a count is exceeded—this process has been omitted to simplify the flow diagram).

When an update count exceeds (or meets) the threshold value, control passes to 380 where a policy request is sent to the highest level server node that can be reached. Policy data are then received at 382 and a new policy decision made. The policy is then updated at 386 and if verified at 390, control passes to 336. If this policy cannot be verified at 390, an error condition is presumed to exist at 394. This can result in any number of corrective actions including a full software reset of the radio and/or presentation of alerts or other error messages.

As previously implied, a cognitive radio CR should quickly identify the policies that apply to it based on its current location, movements and time of day, for example along with other parameters. This is particularly important for rapidly-moving radios, such as is found in aircraft traversing multiple countries or governing authorities. The radio should determine in real time whether it can transmit, and under what conditions should be used for transmission at its current location and time. The CR establishes a usage policy (for example by download from a database in an associated network, or by the process just outlined). A particular policy may only be valid for a certain geographic area. Hence, the cognitive radio can predict when a new policy will be needed as a function of its current location (in two or three dimensional space), signal propagation and a speed and direction of movement. Based upon this data an approximate expiration time can be calculated based on its current location and speed. Also, by sensing its altitude along with its known latitude/longitude (or other location coordinates), the CR can estimate transmit (Tx) propagation and thus decide how often to request a policy update/download.

As noted earlier, policy updates can either be downloaded from the network, or the CR can query neighboring CR's to obtain policy updates (in various formats such as a compressed, layered, or difference format). This latter approach is presumed to provide a much quicker update compared to downloading the entire policy from the network. Using the location, time, and propagation estimates, the CR chooses the most viable frequency and protocol (etc.) to use and verify that the defined policy is available and/or unused. It maintains a history log with policy, location, and interference info to assist in quickly determining how to best communicate (i.e. skip propagation estimate and/or policy update request if CR has already traveled this path before), using coarsely-quantized locations to save storage space. If a new policy is needed but one is not available for this location from either the network or neighboring radios, the CR will compare the last-used policy with a cached policy for the closest location to determine which subset of policy rules to apply. If after a policy change no valid data can be received (i.e., the policy is not verified), the policy used by the transmitter may be beyond this CR's capability, or their policies may be out of sync; the CR then transmits a trouble beacon signal to all. The network detects the beacon and attempts to resync all CR's with a policy usable to all (i.e. least-common denominator of usage capabilities).

Hence, in accordance with certain embodiments, the CR takes advantage of its location, capabilities, and info from neighboring CRs to rapidly determine the best policy for the geographic region. Local caching and decision-making may often eliminate the need to support frequent, large policy downloads.

As previously noted, a cognitive radio that is mobile may pass through a number of regions with different regulatory policies. One such example is an airborne communication system in flight above Western Europe. After identifying spectrum that is unused, it must evaluate the potential spectrum against a policy engine to ensure that its usage is compliant with the local regulations. However, the policy tables are complex, and policy conformance calculations take a long time to perform.

In accordance with certain embodiments consistent with the present invention that cognitive radios will have the most significant regulatory policy requirements written into its memory so its operation will adhere to a given regulatory policy, for example FCC requirements. When a location of the cognitive radio is changed and new policy requirements have to be obeyed, the cognitive radio recognizes it and the policy is updated. The policy can be compared to the nearest neighbor's policy. In the case of a mismatch in policy, the cognitive radio determines the level of necessary update. The policy update should be correct and the policy requirements should remain correct.

In accordance with certain embodiments, this process can be further detailed as follows. When a CR is admitted to an existing P2P group of CRs it carries out the following process:

gets policy and other situational awareness information from each of the members (or from a representative sample of the members, or at least one member);

from the received information, the CR builds a P2P topology understanding of the group of cognitive radios (i.e., determines where it is positioned relative to the other CRs within the group and how its policy is configured compared to the remainder of the group);

compares its policy with the CRs that constitute the most immediate layer (tier 1) of peers; and adjusts its policy accordingly to resemble/fit well with the policies used by the rest of his tier 1 peers.

If the initial P2P group is too large for the processing capabilities of a given CR then the above process can be implemented/performed in several iterations or offloaded to a more powerful authority. If there are too many CRs joining an existing P2P group at the same time, it might bring certain level of instability to the above described algorithm. For that reason a "master" CR for that particular p2p group should have appropriate "admission" pace (a rate at which new CRs are admitted to the CR P2P group) to allow for newly acquired peer to properly work out a stable policy applying to his operation before the next peer is admitted into the group.

Initially, regulatory policy requirements are stored in a predefined template in radio's memory 130 as previously noted. In accordance with certain embodiments, the templates contain entries for the most significant requirements for many different regulatory policies, and software residing in the radio can carry out diagnostics to verify proper implementation of the policy. When the cognitive radio senses that the policy is to be changed it contacts neighboring cognitive radios for a current policy. When new data are downloaded a location and time is stored as historical data in the cognitive radio memory's log to keep track of changes made to the original policy. This information is used to make next decision with better certainty. As noted previously, if after downloading there is a problem interpreting the policy or a failure to properly verify the policy, a new copy of the policy (or new policy) is requested from the closest nodes in the network. The radio keeps track of how many times the policy has been updated. When the number of updates is above predetermined threshold a request for a correct policy will be issued to a higher level node (e.g., an all-knowing server).

As noted above, policy updates can either be downloaded from the network, or the cognitive radio can query neighboring cognitive radios to obtain policy updates (for example, in a compressed, difference format). This latter approach should generally provide a much quicker update compared to downloading the entire policy from the network. In a peer to peer (P2P) environment, where cognitive radios communicate directly with one another without benefit of a network or base station as an intermediary, the situational awareness considerations described in connection with FIGS. 4-6 dictate that a position in three dimensional space should be taken into consideration since the actual position in terms of latitude, longitude and altitude (expressed in any suitable set of coordinates) as well as propagation distance and knowledge of the location of domain boundaries should be considered. As shown previously, there is the potential that higher altitude corresponds to more domains that have to be taken into consideration when making a policy change decision. Additionally, it is noted that frequent changes in policy is generally disadvantageous since each change requires that computational resources be utilized and an interruption or degradation in service may occur during a policy change.

As a result, it should be recognized that multiple layers or categories of situational awareness can exist within a cognitive radio within a given environment. In a given cognitive radio in a given environment, certain layers of situational awareness may be important, while other layers may be less important. In order to enhance the efficiency of policy changes, an understanding of which layers of situational awareness are relevant may be advantageous.

Consider a radio that is operating in the central United States. In this example, the domain is constant, from the perspective of there being a single regulatory agency that controls—the FCC. Hence, the basic rules and regulations will not change; and hence, the cognitive radio need not worry about certain basis parameters of communication such as maximum power and modulation permitted for a particular modulation scheme. The cognitive radio similarly need not worry with potential use of modulation schemes that are not permitted within the United States. In other words, the basic rules are defined.

Figure 8:
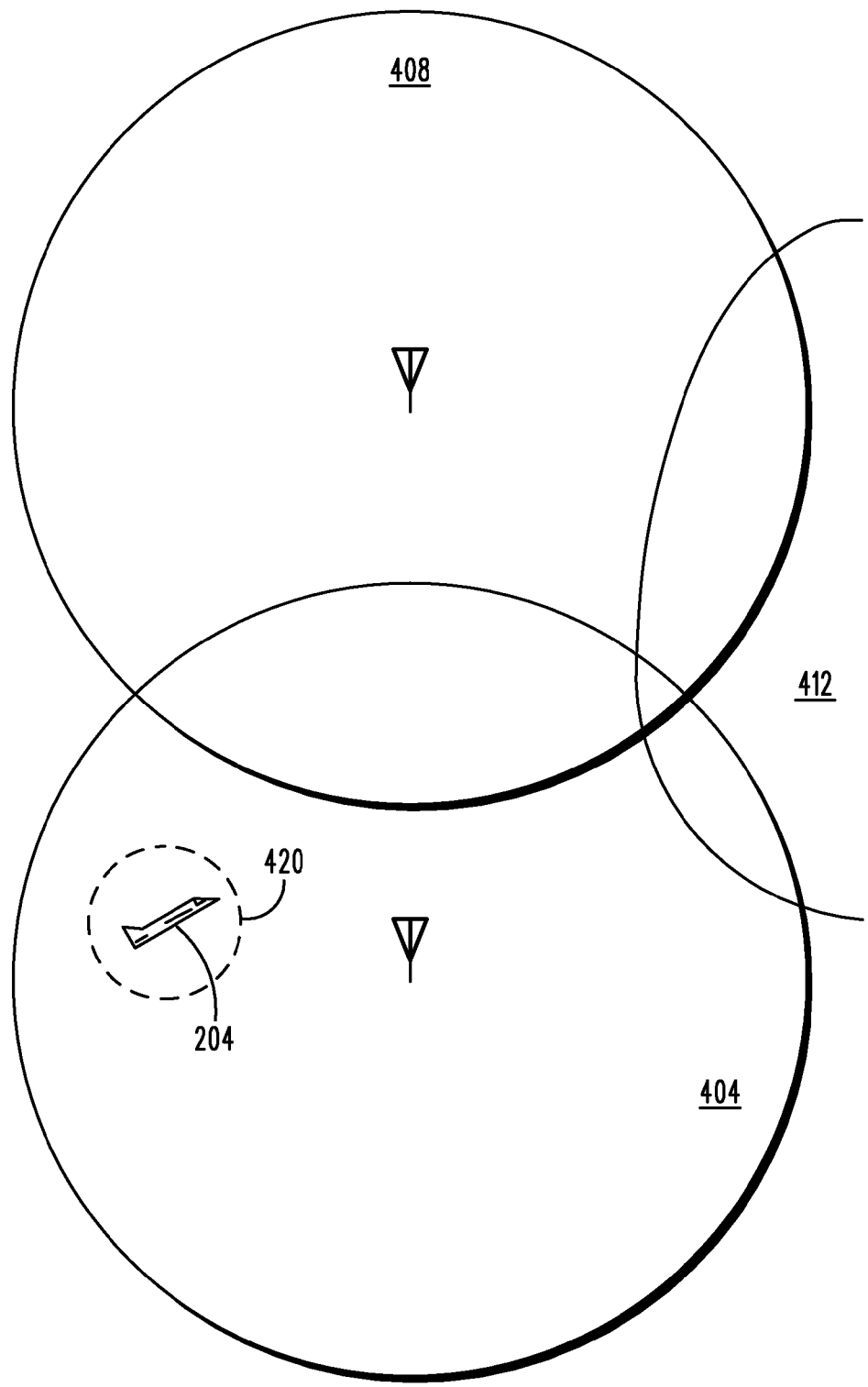
FIG. 8 is a flow chart depicting a session based policy decision process using cached policy information in accordance with some embodiments of the invention.

However, under consideration for use by cognitive radios is use of unoccupied spectrum normally reserved for commercial television and radio broadcast. Hence, if a cognitive radio is moving and if it currently is using an unoccupied commercial broadcast television or radio channel spectrum, it should be aware of changes in use of such spectrum. This is depicted in FIG. 8 where the operational range of multiple commercial broadcast transmitters is shown as overlapping circles or arcs 404, 408 and 412. The cognitive radio 204 is shown to be presently in the operational range of the transmitter having range shown as 404 and is heading toward the operational range 408. A third transmitter's range is shown as 412 and the cognitive radio's transmission range is depicted in broken lines as 420. In this illustration, let us presume that the cognitive radio is using a frequency band that overlaps that used in 408. Clearly, as described previously, when the cognitive radio's range 420 approaches the range 408 (and soon 412), a policy change will be required for the cognitive radio to continue communication without receiving or causing interference. By way of example, one could assume that the transmitters producing signals within the various ranges 404, 408 and 412 are broadcast television transmitters. In this example, a minimal amount of information may be needed for the cognitive radio to implement a change. For example, the frequency band occupied by the cognitive radio 204 can simply be changed so as to not be the same as the band for range 404 or 408 (since the two ranges intersect for a period. This range is tantamount to a simple frequency change and may be made quickly in many instances by reference to P2P communication with cognitive radios within the P2P group.

Now consider another example. If a CR-A is approaching CR-B and CR-C, and CR-A needs to change policy (or wishes to optimize its policy or verify a policy), it can listen to information from or explicitly request information from CR-B and/or CR-C. The information request can be designed efficiently to elicit responses that can be communicated efficiently. By comparing information received with CR-A's current policy, it can be determined if a large change is needed or a small change will do. A small change may be possible with a small but efficient information exchange, whereas as large change may require a larger amount of information to be exchanged and perhaps some transition time to make the change.

Consider for example, if CR-A is using CDMA. It would be an advantage to be able to determine what communication parameters are being used successfully by other CDMA transmitters nearby. Assume a query of CR-B and CR-C (e.g., a broadcast general query) reveals that CR-B is using FDMA and CR-C is using CDMA. It is then clear that further request of communication parameters from CR-B would likely involve communication of a large amount of information, and conversion to FDMA might involve a brief service interruption for CR-A. By contrast, CR-C is already using similar parameters to those in use by CR-A. Hence, a policy change to CR-A involving information obtained from CR-C will likely involve a smaller data exchange and minimal modification of CR-A's current operational parameters.

Figure 9:
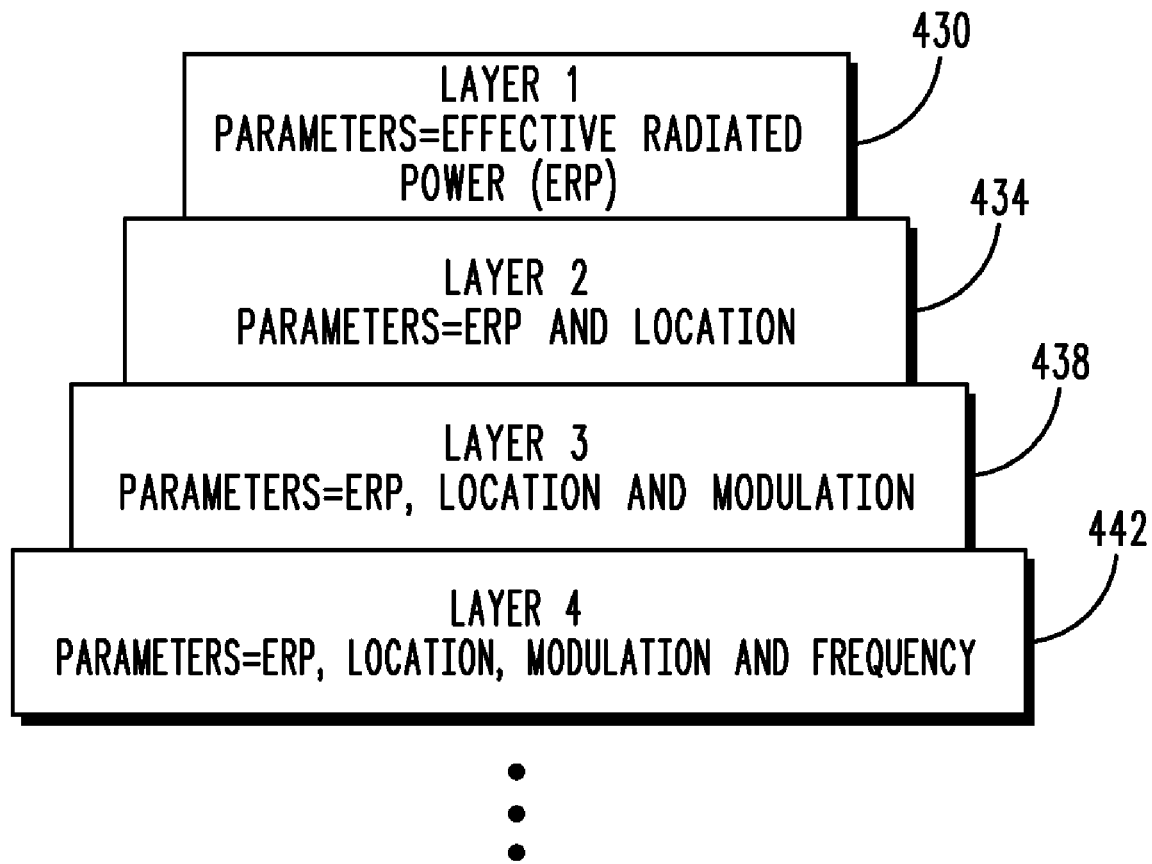
FIG. 9 is a flow chart depicting a policy decision process using simplified policy trees in accordance with some embodiments of the invention.

FIG. 9 depicts one abstraction of the layering of policies as contemplated by certain embodiments consistent with the present invention. In this layered concept, which should not be considered limiting, the topmost layer 430 is single dimensional and contains only effective radiated power (ERP) as a parameter. In many instances, this will be the most important consideration since transmission at greater power output than necessary is wasteful of battery power for battery powered CRs, and higher power translates to greater potential for interference with other communications.

A next layer, shown as 434 has two dimensions—effective radiated power and location which are mapped to one another, so that ERP is in the context of a particular geographic or three dimensional location.

The third layer, shown as 438 has three dimensions. In this example those dimensions are—ERP, location and modulation. Thus the second layer has a dimensional increase in complexity over the first layer, and the third layer adds a third dimension of complexity over that of the second layer.

The fourth layer as shown, layer 442, adds yet another layer of complexity. In this example, the fourth layer adds frequency as a fourth dimension of complexity to the layer. Additional layers can be devised to provide additional parameters that might be used to further characterize the function of the cognitive radio. Although each increasing layer preferably increases the complexity by a single dimension in the above examples, this should not be considered limiting, since other arrangements are also possible.

As seen from the above, a query for layer 1 information is straightforward and provides for only a response of ERP (e.g., maximum effective radiated power), whereas a query for layer 3 information calls for a response that corresponds to three separate parameters that characterize a suitable set of policy related data.

Hence, in accordance with certain embodiments, a cognitive radio can use the layers of policy parameters advantageously so as to limit the queries made to zero in on an appropriate set of communication parameters. By way of example, the first query might be for a layer 2 policy. If layer 2 matches the cognitive radio's current policy, or a projection made by the cognitive radio for a policy needed for a new domain, then the CR can determine what level of additional information may be needed to establish the new policy. In this example, the radio may only need the additional parameter of layer 3 to complete its policy change. If, however, layer 2 fails to match the radio's current policy, or a projection made by the cognitive radio for a policy needed for a new domain, then a deeper layer of parameters may be requested (e.g., layer 4 or deeper). In accordance with certain embodiments, the policy layers may be directly matched to the amount and granularity of situational awareness data that a given CR has acquired.

It is additionally contemplated that a query of an authority (e.g., another CR in the P2P group having more power or acting as a master) need not be limited to a layer of information per se, but the layers may provide a convenient starting point for a query. For example, an initial query for layer 4 information may provide a high degree of correlation with a projected policy, but additional information is required to optimize communication. For example, a focused interrogation may follow to determine a specific frequency—rather than a query for layer 4 information. In the P2P context this means the higher level policy you like/need to operate the more queries you have to do in order to operate that policy level. Generally, it is logical to expect that a higher policy level might be required when the environment is crowded, but in this circumstance the CR has access to a larger peer group.

Figure 10:
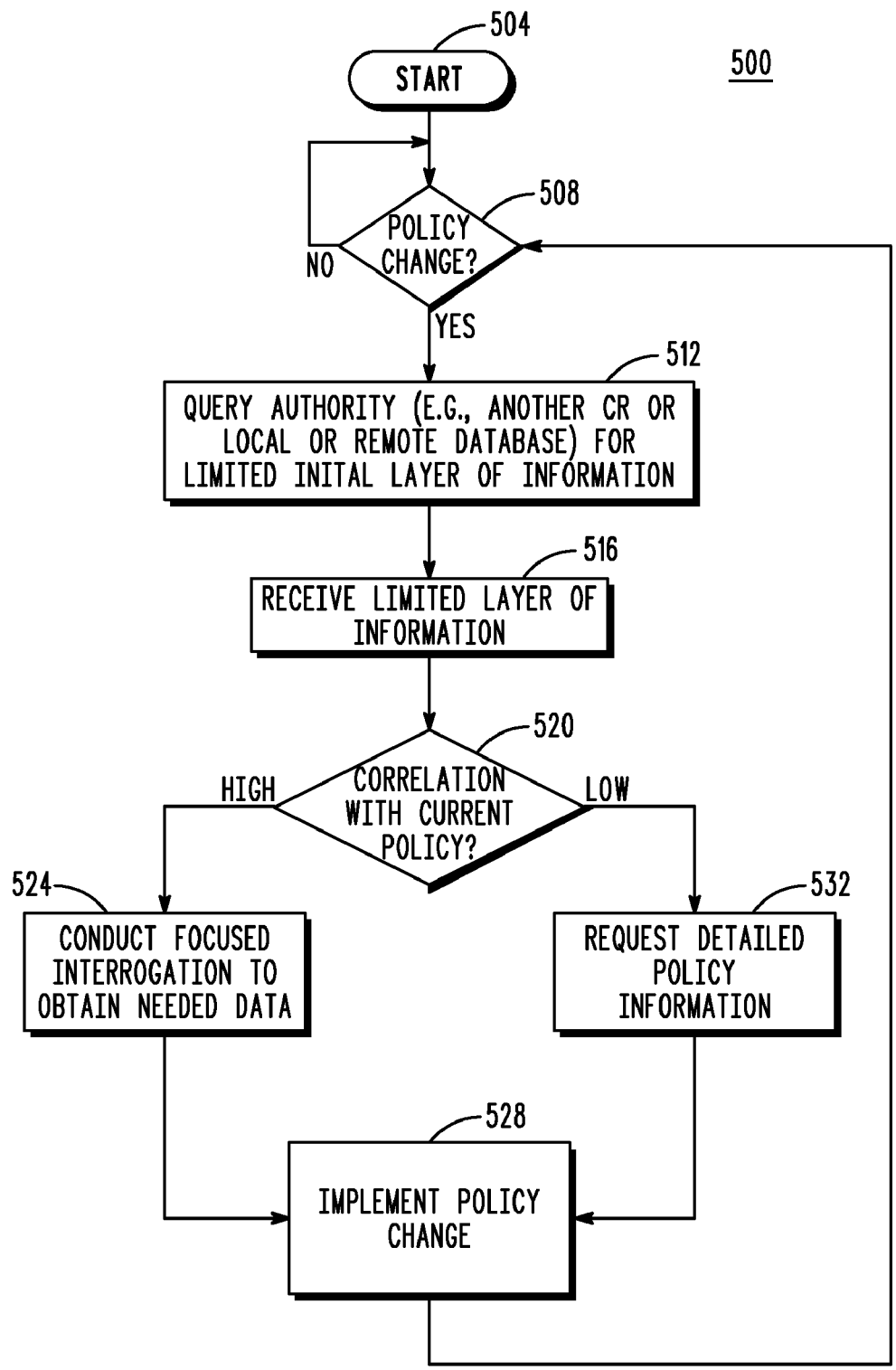
FIG. 10 is a flow chart depicting a relationship between complexity of a decision tree and frequency with which a new decision tree is updated in accordance with some embodiments of the invention.

FIG. 10 depicts a view of use of this concept of policy layers as process 500 starting at 504. When a CR determines that a policy change is to occur at 508 an authority is queried at 512 (e.g., a nearby CR, base station, server, or even a local database) to learn determine a limited amount of information such as a high level layer of information. When this layer of information is received at 516, it is correlated at 520 with the policy that is currently in use. This correlation process can take many forms, but essentially determines how close the current policy is to an abbreviated policy definition received as a result of the query at 516. While two degrees of granularity in the correlation are depicted in this diagram, the invention is certainly not limited to two. In certain embodiments, the correlation is determined to be either high or low, where high correlation means that the information received is similar to that currently in use, and low correlation indicates that the information received is significantly different than the policy currently in use. This determination is made at 520, and if the correlation is high at 520, a focused interrogation can be carried out at 524 to obtain the needed information to adjust the current policy to a new acceptable policy. Once this information is obtained, at 528 the policy change can be implemented. On the other hand, if correlation with the current policy is low, this indicates a large amount of difference between the current policy and the policy depicted in the limited layer of information received at 516. In this case, more detailed policy information is requested in an interrogation at 532—up to and including full definition of the new policy. The policy change can then be implemented at 528 and control returns to 508 to await the next policy change.

Several examples of the type of limited query that might be initially carried out in 512 might include, but are not limited to: a query to determine a regulatory domain; a query to determine a type of modulation; a query for a deeper layer of policy parameters; or a query to determine a broad category of communication policy being used by another cognitive radio.

Several examples of the type of focused interrogation carried out at 524 might include, but are not limited to: a power parameter; a frequency parameter; a measure of interference encountered; or another parameter specific to a broad policy definition previously determined.

Figure 11:
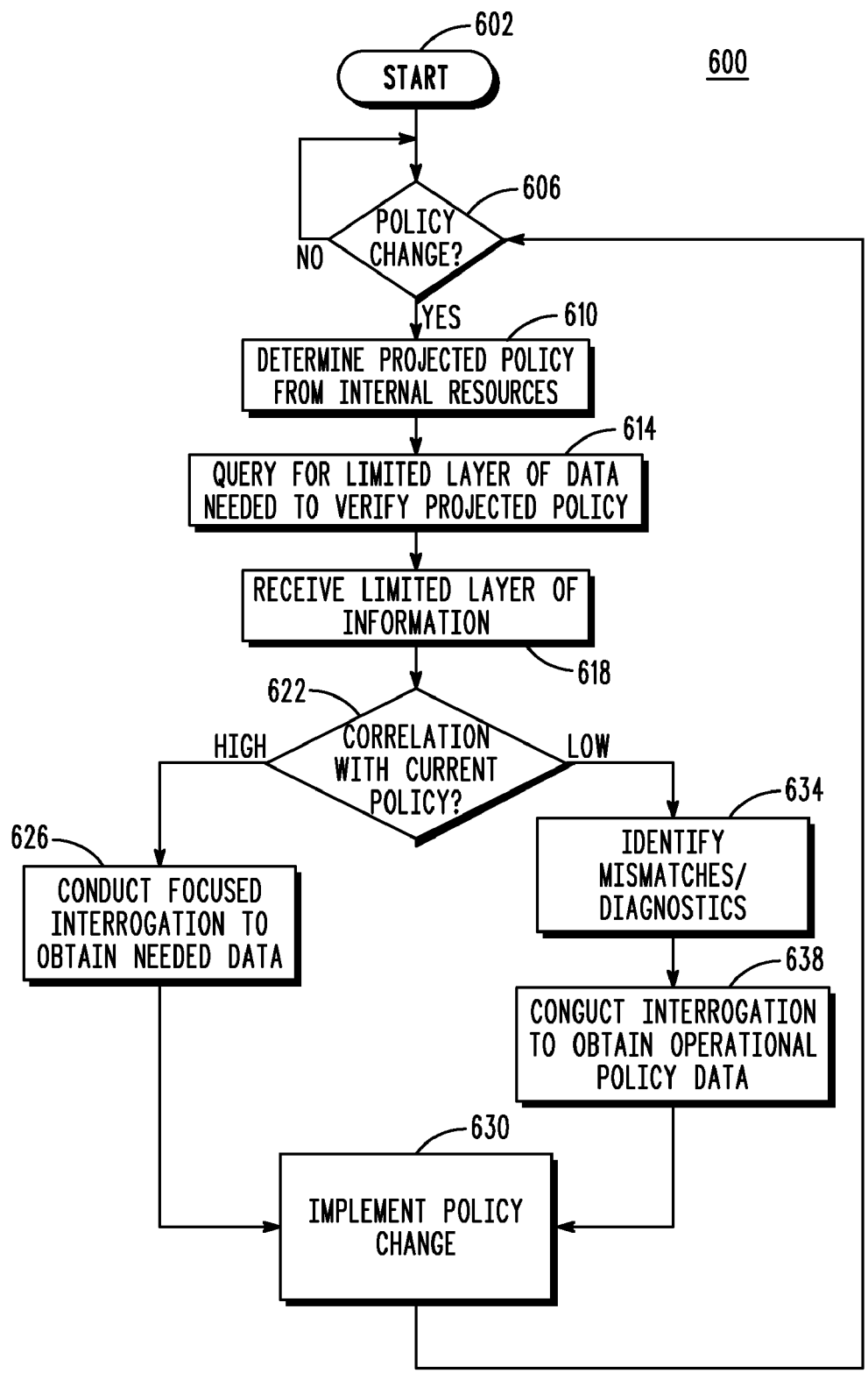
FIG. 11 is an example of a session based policy making process in accordance with some embodiments of the invention.

FIG. 11 provides another example process 600 that is somewhat similar to that of process 500, and starts at 602. In this example, however, once a policy change is determined needed at 606, a projected policy is determined from internal resources (e.g., a database, decision tree, or other internal mechanism) at 610. Once this policy is determined, a query can be issued to any suitable authority at 614 for a limited layer of information that provides enough information to verify a suitable choice of policy. This limited layer of information is received at 618 and is correlated with the projected policy obtained by the internal mechanism of the cognitive radio at 622. Again, if the correlation is high, a focused interrogation can be conducted if needed at 626 to determine additional focused information to implement a policy decision. Such decision is then implemented at 630.

If the correlation is low at 622, a mismatch is established at 634 which may also invoke diagnostic measures of various types. The net result is that the policy is not verified and an interrogation can be carried out at 638 to obtain a more detailed operational policy that can then be implemented at 630. Control then returns to 606 to await the next policy change.

In this example, similar policy layers can be queried for at the various stages of process 600 as was the case at process 500. However, the distinction is that a projected policy is determined internally and a query for limited information is used to verify that projection. By way of example, assume that a CR is leaving a region that does not permit CDMA communication and entering a region that does permit CDMA. One limited query will be to determine if CDMA is permitted. If so, the CR can be relatively certain that its decision criteria were sound. More focused queries may or may not be needed to determine an optimal set of communication parameters.

As noted previously, a cognitive radio may receive information from a variety of sources including, but not limited to, GPS data, internal logs, information from neighboring radios, information from servers, and information deduced from decision trees to name a few. It is noted that, particularly as the communication environment becomes more complex (e.g., multiple regulatory domains are nearby), one set of policy information may conflict with other sets of policy information. Moreover, as the market for cognitive radios expands, future generations of radios will doubtless have more computational power than current radios. As a result, there will be a varying degree of reliability that might be associated with data received from a particular source in a particular environment.

In a point to point communication environment where a domain change or other policy change is indicated, a cognitive radio seeking policy information from another cognitive radio that is already successfully communicating in the new environment should as a default or fallback position adopt the policy that the other radio is successfully using. Moreover, generally a cognitive radio should adopt a policy suggested by a cognitive radio (or other authority) with greater processing resources than the cognitive radio has at its disposal.

However, with these generalities in mind, it is noted that the cognitive radio may receive information that for whatever reason is not reliable. For example with reference back to FIG. 4, a radio CR-A emerging from a particular domain that the cognitive radio of interest CR-C is entering may advise a policy that is operational, but not optimal. If radio CR-A is primarily communicating low speed voice data to radio CR-B, and CR-C needs to communicate high speed video data, the policy being successfully used by CR-A may be unsuitable. In this instance, CR-C may use the policy for a short period and find that it is unsuitable, and thus another policy change may be needed. In this example, CR-C may apply a figure of merit for reliability of the information from CR-A indicating CR-A's policy advice to be unreliable (for CR-C's purposes). In the future, it may therefore seek other information before adopting CR-A's policy. By maintaining a log with historical data representing the reliability of information received from a particular source, the cognitive radio may base future policy decisions, in part, upon that reliability.

Figure 12:
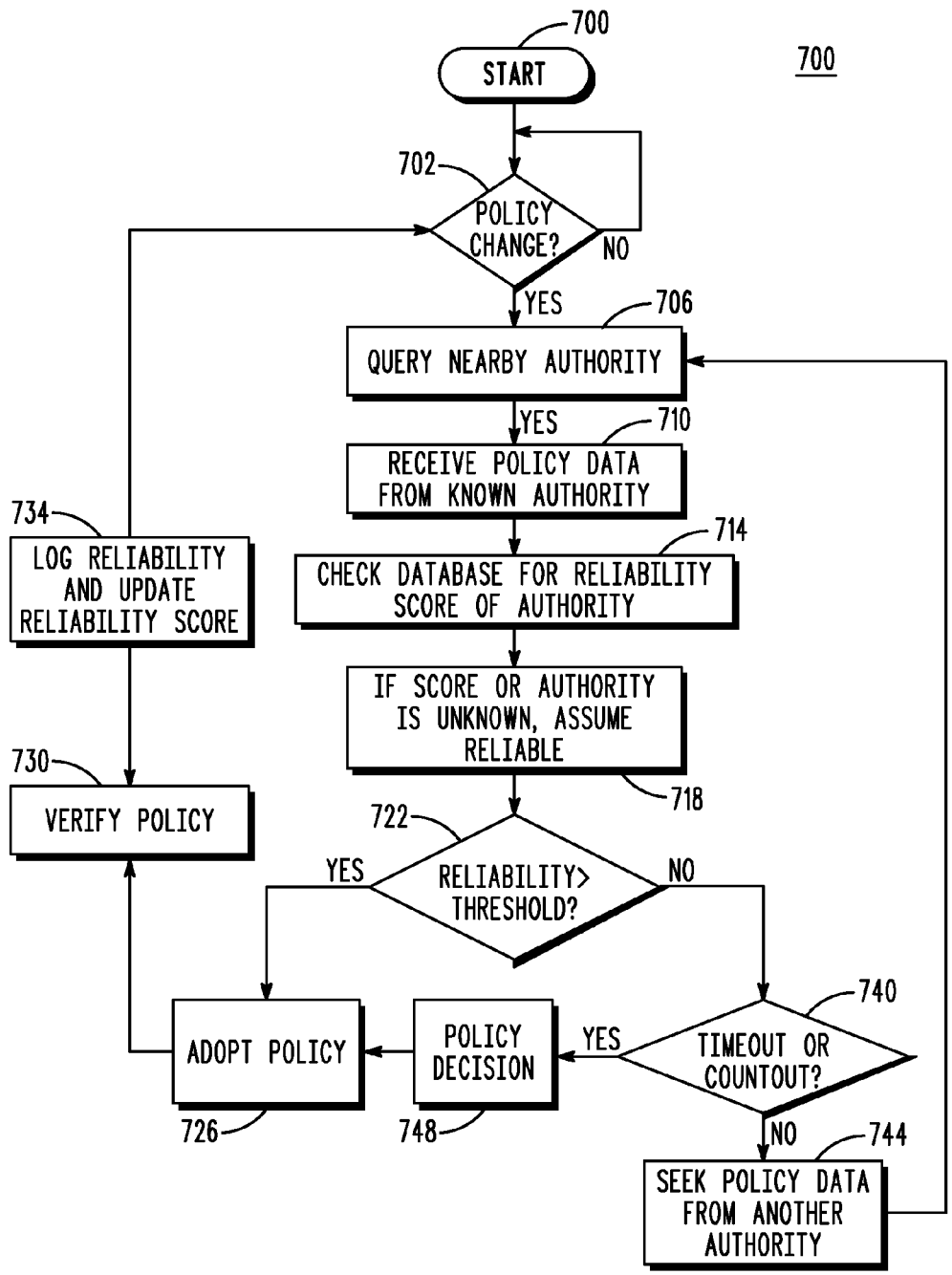
FIG. 12 is flow chart of an example process for making policy decisions based upon the reliability of an authority consistent with some embodiments of the invention.

In accordance with certain embodiments, policy information may be tabulated for example, as shown in FIG. 12 starting at 700. When, at 702, a determination is made that a policy change is needed for any number of reasons a query is conducted by the cognitive radio of a nearby authority at 706. A reply of policy information is received at 710 from a known authority. In this example, known authorities may have historical data associated with them so that a reliability score can be determined. For example, a simple method of calculating a reliability score is to start at zero and add a 1 for a policy that was successfully adopted (with any number of variables being considered in determining success). If a policy was adopted unsuccessfully, a 1 can be subtracted to obtain a policy score. In this example, anything greater than or equal to 0 might be considered acceptably reliable, while less than 1 might be considered unreliable. Other methods for computing reliability can also be devised without departing from embodiments consistent with the present invention.

A database can therefore be consulted to determine a reliability score for a particular authority at 714, or if the authority is unknown, it can be initially presumed reliable at 718. If the authority is known, its reliability is compared to a threshold at 722 and if the reliability is greater than the threshold, the policy data are adopted at 726 and the policy is implemented as the new policy. This new policy is then verified at 730 and the reliability (based on verification in this example) is logged and an updated score is determined at 734. Control then returns to 702 to await need for a new policy.

If the authority is considered unreliable at 722, and no timer or counter has timed out at 740 (indicating a maximum number of tries at a new policy), control passes to 744 where it is determined that policy data should be sought from a different authority and control returns to 706. Although not shown in this diagram, if the only source or sources of policy data are unreliable, the cognitive radio may have not choice but to make a policy decision based upon the data or based upon its own policy decision making capabilities. When a maximum time or number of authorities exceeds a maximum at 740, the radio may have no choice but make a policy decision as best it can (depending upon its capabilities and internal and external resources). In one embodiment, if policy data are received from multiple unreliable sources, for example, the cognitive radio can attempt to find common information from those sources that leads to a policy decision. In other embodiments, the cognitive radio may use internal policy trees to make the decision or use other available resources, or may maintain the same policy for as long as possible before trying again. In any event, a policy decision is made at 748 and adopted at 726 as previously noted.

The measurement of reliability as used in the above process may involve many factors (rather than the +1, −1 process used for illustration). For example, a cognitive radio, acting as an authority, that spends large amounts of time in a particular domain may be deemed to have high reliability in that domain, while having low reliability in other domains. Similarly, an authority that has greater processing power may be presumed to have higher reliability than one that has lower processing power.

Additionally, feedback from any or all of the other cognitive radios in the P2P group can be factored in—that is, a radio receiving policy data from CR-A, may tell other radios that the information from CR-A is either reliable or unreliable (i.e., feedback from other users). Under this scenario, a radio can seek to elevate its status as a trusted authority by providing reliable information and receiving feedback from other radios as to its reliability (much as a seller or buyer in an online auction may receive an elevated status as a seller or buyer by virtue of receiving positive feedback from buyers or sellers respectively). In another example, each radio can build its own database of reliability such that CRs found to be previously reliable within particular constraints may be deemed highly reliable.

When updating and building situational awareness in a P2P context, as previously stated, it would be advantageous for a particular CR to work out the P2P topology ("who is who" and where is each CR positioned relative to other). It is also important to recognize that this kind of topology can be unstable due to multiple CRs moving from place to place. In this case a policy change can be initiated once a given CR has one or more additional tier 1 peers (i.e., when more CRs are in the vicinity, the CR may have to be more careful not to interfere with them).

Generally, a cognitive radio can have the most significant regulatory policy requirements written into its memory so its operation will adhere to a given regulatory policy, for example FCC requirements. When a location of the radio is changed and new policy requirements have to be obeyed, the cognitive radio should recognize it and update the policy. The policy can be compared to the nearest neighbor's policy. In the case of the mismatch the cognitive radio determines the level of necessary update. In order to permit continuous communication, the policy update should of course be correct. Initially regulatory policy requirements can be stored in a predefined template in radio's memory. The template can contain entries for the most significant requirements for many different regulatory policies. The radio can have its own diagnostics to verify proper implementation of the policy. When the cognitive radio senses that policy should be changed it contacts neighbor CRs for a current policy. When new data are downloaded a location and time is stored in a 'data history' to keep track of changes made to the original policy. This information can be used to make a next decision with better certainty. If after downloading there is a problem interpreting the policy, a new copy of the policy can be requested from the closest nodes in the network. The radio can keep track of how many times the policy has been updated. When the number of updates is above predetermined threshold a request for a correct policy will be issued to a higher level node such as an all-knowing server or master CR.

As noted above, policy updates can either be downloaded from the network, or the CR can query neighboring CR's to obtain policy updates (for example, in a compressed, difference format). This latter approach is presumed to provide a much quicker update compared to downloading the entire policy from the network. The need to seek policy updated updates in a P2P environment can be the result of movement of the CR or movement of other CRs or proximity to moving sources of interference or movement of other devices that might be interfered with (for example). Velocity of movement, for example, may be used as one parameter within an ad hoc network topology as a main trigger for policy updates or change to the interpretation of the specific policy. Altitude is another factor that affects the interference caused or received by a CR and may thus further factor into the determination of a need or desirability to change policy.

The terms first, second, third, etc. as used in the claims that follow are to be interpreted simply as convenient labels without any connotation to a specific order or hierarchy.

Thus, in a cognitive radio, a method consistent with certain embodiments of establishing an operational policy for use in a Peer-to-Peer (P2P) group, wherein the policy can be described by layers of policy parameters with progressively higher layers having a progressively increasing number of parameters involves determining that a policy change is to be made from a current policy; requesting policy information from at least one P2P group member; receiving a policy description from the at least one P2P group member; and implementing a change in the lowest layer policy parameter to establish a new operational policy.

In certain embodiments, the method further involves monitoring changes in the P2P group topology; and modifying the new operational policy when the P2P group topology changes in a manner that renders the new topology unsuitable for use as determined by the cognitive radio. In certain embodiments, the determining that a policy change is to be made is based upon a spatial change in the P2P group topology, so that the new policy is determined to be made before transmission from the cognitive radio is projected to enter the policy domain of another P2P group member. In certain embodiments, the determining that the policy change is to be made is based in part upon a number of P2P radios in a cluster of said P2P radios. In certain embodiments, the policy description comprises a policy description for a policy layer structure. In certain embodiments, the cognitive radio simultaneously belongs to a plurality of topologies of P2P radios, and wherein the cognitive radio stores a policy description for each topology In certain embodiments, the requesting comprises requesting policy information from a cognitive radio belonging to a P2P cluster having a higher trust rating than another available P2P cluster. In certain embodiments, the trust rating is determined on the basis of at least one of: P2P cluster group size, depth of the layered structure of the policy, granularity of the layered structure of the policy, and temporal stability of the policy of the P2P cluster.

In another embodiment, a cognitive radio operating in a Peer-to-Peer (P2) group, a method of establishing an operational policy, wherein policy data are arranged in a hierarchy of layers, with higher layer of the hierarchy specifying fewer policy parameters than lower layers which specify increasing numbers of communication policy parameters involves determining that a policy change is to be made to a new operational policy; determining a policy depth in terms of layers from a number of members of the P2P group; requesting a layer of operational policy information from an authority; receiving the layer of operational policy information from the authority; correlating the layer with a specified operational policy; if the layer correlates with the specified operational policy with at least a threshold level of correlation, then conducting a focused interrogation to obtain only the additional parameter or parameters needed to adjust the specified operational policy to the new operational policy; if the layer does not correlate with the specified operational policy with at least the threshold level of correlation, then requesting a policy layer that specifies more parameters than the first policy layer in order to define the new operational policy; and implementing the new operational policy.

In certain embodiments, the specified operational policy comprises a current policy in use by the cognitive radio. In certain embodiments, the specified operational policy comprises a projection of new operational policy for use by the cognitive radio, wherein the projection is made by the cognitive radio using internal resources. In certain embodiments, the authority comprises one of a global, regional or local authority. In certain embodiments, the method further involves monitoring changes in the P2P group topology; and modifying the new operational policy when the P2P group topology changes in a manner that renders the new topology unsuitable for use as determined by the cognitive radio. In certain embodiments, the determining that a policy change is to be made is based upon a spatial change in the P2P group topology, so that the new policy is determined to be made before transmission from the cognitive radio is projected to enter the policy domain of another P2P group member. In certain embodiments, the determining that the policy change is to be made is based in part upon a number of P2P radios in a cluster of said P2P radios. In certain embodiments, the policy description comprises a policy description for a policy layer structure. In certain embodiments, the cognitive radio simultaneously belongs to a plurality of topologies of P2P radios, and wherein the cognitive radio stores a policy description for each topology. In certain embodiments, the requesting comprises requesting policy information from a cognitive radio belonging to a P2P cluster having a higher trust rating than another available P2P cluster. In certain embodiments, the trust rating is determined on the basis of at least one of: P2P cluster group size, depth of the layered structure of the policy, granularity of the layered structure of the policy, and temporal stability of the policy of the P2P cluster.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. In a cognitive radio operating in a Peer-to-Peer (P2) group, a method of establishing an operational policy, wherein policy data are arranged in a hierarchy of layers, with higher layer of the hierarchy specifying fewer policy parameters than lower layers which specify increasing numbers of communication policy parameters, comprising:

determining that a policy change is to be made to a new operational policy;

determining a policy depth in terms of layers from a number of members of the P2P group;

requesting a layer of operational policy information from an authority;

receiving the layer of operational policy information from the authority;

correlating the layer with a specified operational policy;

if the layer correlates with the specified operational policy with at least a threshold level of correlation, then conducting a focused interrogation to obtain only the additional parameter or parameters needed to adjust the specified operational policy to the new operational policy;

if the layer does not correlate with the specified operational policy with at least the threshold level of correlation, then requesting a policy layer that specifies more parameters than the first policy layer in order to define the new operational policy; and implementing the new operational policy.

2. The method according to claim 1, wherein the specified operational policy comprises a current policy in use by the cognitive radio.

3. The method according to claim 1, wherein the specified operational policy comprises a projection of new operational policy for use by the cognitive radio, wherein the projection is made by the cognitive radio using internal resources.

4. The method according to claim 1, wherein the authority comprises one of a global, regional or local authority.

5. The method according to claim 1, further comprising monitoring changes in the P2P group topology; and modifying the new operational policy when the P2P group topology changes in a manner that renders the new topology unsuitable for use as determined by the cognitive radio.

6. The method according to claim 1, wherein the determining that a policy change is to be made is based upon a spatial change in the P2P group topology, so that the new policy is determined to be made before transmission from the cognitive radio is projected to enter the policy domain of another P2P group member.

7. The method according to claim 1, wherein the determining that the policy change is to be made is based in part upon a number of P2P radios in a cluster of said P2P radios.

8. The method according to claim 1, wherein the policy description comprises a policy description for a policy layer structure.

9. The method according to claim 1, wherein the cognitive radio simultaneously belongs to a plurality of topologies of P2P radios, and wherein the cognitive radio stores a policy description for each topology.

10. The method according to claim 1, wherein the requesting comprises requesting policy information from a cognitive radio belonging to a P2P cluster having a higher trust rating than another available P2P cluster.

11. The method according to claim 10, wherein the trust rating is determined on the basis of at least one of: P2P cluster group size, depth of the layered structure of the policy, granularity of the layered structure of the policy, and temporal stability of the policy of the P2P cluster.

* * * * *

UNITED STATES PATENT AND TRADEMARK OFFICE
CERTIFICATE OF CORRECTION

PATENT NO.       : 7,743,121 B2                                         Page 1 of 1
APPLICATION NO.  : 11/839133
DATED            : June 22, 2010
INVENTOR(S)      : Boscovic et al.

It is certified that error appears in the above-identified patent and that said Letters Patent is hereby corrected as shown below:

On Title Page 2, Item (56), under "OTHER PUBLICATIONS", in Column 2, Line 38, delete ""Congnitive" and insert -- "Cognitive --, therefor.

On Title Page 2, Item (56), under "OTHER PUBLICATIONS", in Column 2, Line 45, delete "Internationa" and insert -- International --, therefor.

In Column 1, Line 52, delete "situations" and insert -- situations. --, therefor.

In Column 6, Line 45, delete "authority," and insert -- authority. --, therefor.

In Column 11, Line 19, delete "p2p" and insert -- P2P --, therefor.

In Column 18, Line 22, delete "(P2)" and insert -- (P2P) --, therefor.

In Column 12, Line 26, in Claim 1, delete "(P2)" and insert -- (P2P) --, therefor.

Signed and Sealed this
Sixth Day of November, 2012

David J. Kappos
*Director of the United States Patent and Trademark Office*